(No Model.)

A. PATTON.
PLOW CLEVIS.

No. 278,453. Patented May 29, 1883.

WITNESSES:
Chas T Howell.
C. Sedgwick

INVENTOR:
A. Patton
BY Munn & Co
ATTORNEYS.

UNITED STATES PATENT OFFICE.

ANDREW PATTON, OF NEW ORLEANS, LOUISIANA.

PLOW-CLEVIS.

SPECIFICATION forming part of Letters Patent No. 278,453, dated May 29, 1883.

Application filed July 24, 1882. Renewed April 19, 1883. (No model.)

*To all whom it may concern:*

Be it known that I, ANDREW PATTON, of New Orleans, in the parish of Orleans and State of Louisiana, have invented a new and Improved Plow-Clevis, of which the following is a full, clear, and exact description.

My invention consists of improvements in the device for hitching the team to the clevis, having for its object to prevent the hitching device from dropping out of the notch in the clevis-head by which the pitch of the draft of the plow is regulated, and I propose to rivet the ends of the clevis-bolts over the washers or nuts, for guarding more effectually against their loss by theft or otherwise when left in the field or when in use, all as hereinafter fully described.

Reference is to be had to the accompanying drawings, forming a part of this specification, in which similar letters of reference indicate corresponding parts in both the figures.

Figure 1:
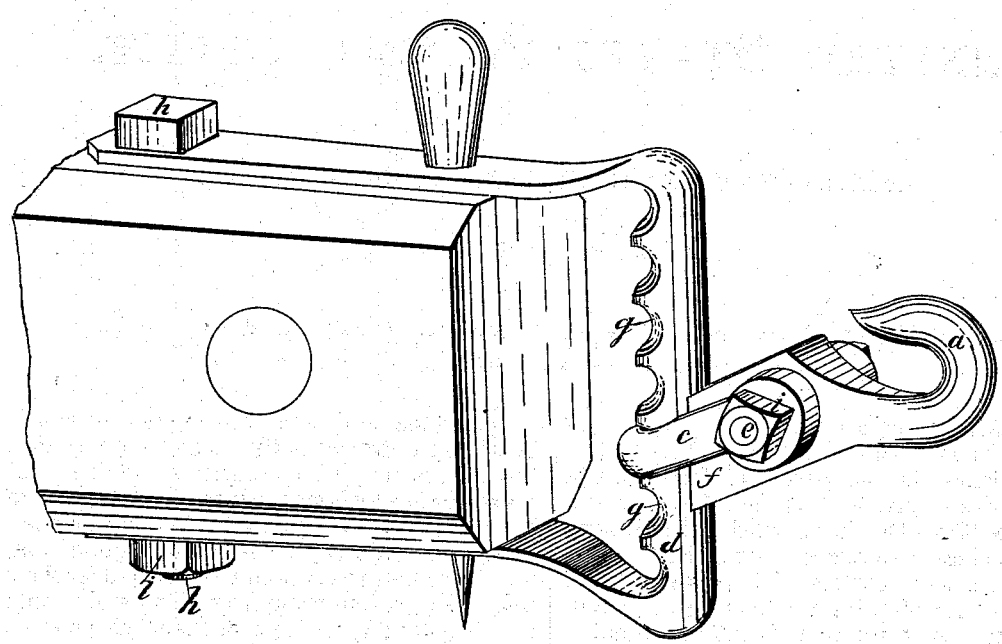
Figure 2:
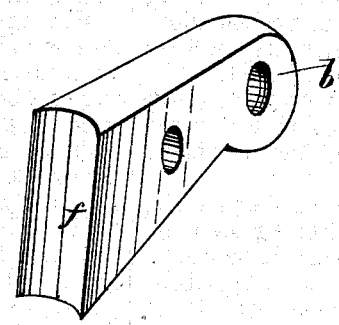

Figure 1 is a perspective view of a plow-clevis with my improvements, and Fig. 2 is a perspective view of a modified form of part of the hitching device.

I propose to use either a hook, $a$, or an eye, $b$, and a small clevis, $c$, for hitching the team to the notched head of the main clevis $d$, connecting said hook or eye to clevis $c$ by a bolt, $e$, and I make the said hook or eye with a grooved and inclined butt extension, $f$, sufficiently long to bear on the head $d$ and prevent the hook or eye and clevis $c$ from swinging downward and falling out of the notch $g$, in which the device may be set, so that when once set in position the device will not fall down and require resetting, as such devices now do, causing much trouble and delay. The inclined shape of the end $f$ enables the hook or eye to be swung upward readily at any time, so that the device may be disconnected in the most ready manner whenever it may be required to do so. I will use either a hook, $a$, for an open connection, or an eye, $b$, for a close connection, and I propose to rivet bolts $e$ and $h$ over their nuts $i$, to prevent them from being stolen out; or the bolts $e$ $h$, or either of them, may not be so riveted over, if desired.

With this construction the clevis of the hook or eye is held engaged in a slot $g$ by the weight of the parts, and by swinging the outer end of the hook or eye upward the clevis may be almost instantly disengaged and as quickly readjusted in any one of the slots $g$, to regulate the working depth of the plow, as will be readily understood.

Having thus described my invention, I claim as new and desire to secure by Letters Patent—

1. An improved clevis attachment consisting of a hook or eye having an inclined and grooved extension to fit upon the head of any ordinary clevis, and a small clevis pivoted to said hook or eye and adapted to engage with the notches of said ordinary clevis, substantially as herein shown and described.

2. The combination, with the notched clevis-head $d$, of the hook $a$, having the inclined and grooved extension $f$, and the small clevis $c$, pivoted to said hook and engaging with the notches of the said clevis-head, substantially as and for the purpose set forth.

ANDREW PATTON.

Witnesses:
 N. B. TRIST,
 A. DEMAREST, Jr.